United States Patent [19]

Pryor et al.

[11] 4,216,837
[45] Aug. 12, 1980

[54] DIFFRACTION OPTICAL WEIGHING SYSTEM

[75] Inventors: Timothy R. Pryor; Omer L. Hageniers, both of Windsor, Canada

[73] Assignee: Diffracto Ltd., Windsor, Canada

[21] Appl. No.: 915,384

[22] Filed: Jun. 14, 1978

[51] Int. Cl.² ............................................. G01G 3/00
[52] U.S. Cl. ........................................ 177/1; 177/225; 177/DIG. 6; 209/594; 209/912; 250/231 R
[58] Field of Search ................... 177/58, DIG. 6, 225, 177/1; 209/594, 916; 250/231 R

[56] References Cited

U.S. PATENT DOCUMENTS

| 2,158,023 | 5/1939 | Smith | 209/594 |
| 3,664,739 | 5/1972 | Pryor | 356/32 |
| 3,884,581 | 5/1975 | Pryor | 356/356 |

FOREIGN PATENT DOCUMENTS 777941  7/1957  United Kingdom ............... 177/210 C Primary Examiner—Jospeh W. Hartary
Attorney, Agent, or Firm—Larson, Taylor and Hinds

[57] ABSTRACT

Weighing apparatus and method. A plurality of weigh members are moveable in sequence in a continuous path. Each weigh member receives an item to be weighed and includes a member which is moveable in response to the weight of the carried item. Preferably, the moveable member is elastically deformable. When an item to be weighed is deposited on a weigh member, the moveable member moves in response to the weight and then "springs" back and so on in an oscillating fashion. The weigh members, each carrying an item to be weighed, are rapidly moved in sequence along the continuous path to a weighing location and the time, while short, is sufficient to permit oscillating movement of the moveable member to substantially cease by the time that the weigh member arrives at the weighing location. At the weighing location, electromagnetic radiation is impinged upon a boundary edge of the moveable member and a pattern of electromagnetic radiation is produced which is characterized by the position to which it moved in response to the weight of an item carried by the weigh member. In a preferred embodiment, the electromagnetic radiation is impinged upon two boundary edges, one fixed and one moving with the moveable member. Diffraction waves emanating from the boundary edges interact to form an interference pattern and the interference pattern is characteristic of the position of the moveable boundary edge relative to the fixed boundary edge. The pattern is analyzed to determine the weight of an item borne by each respective weigh member.

35 Claims, 12 Drawing Figures

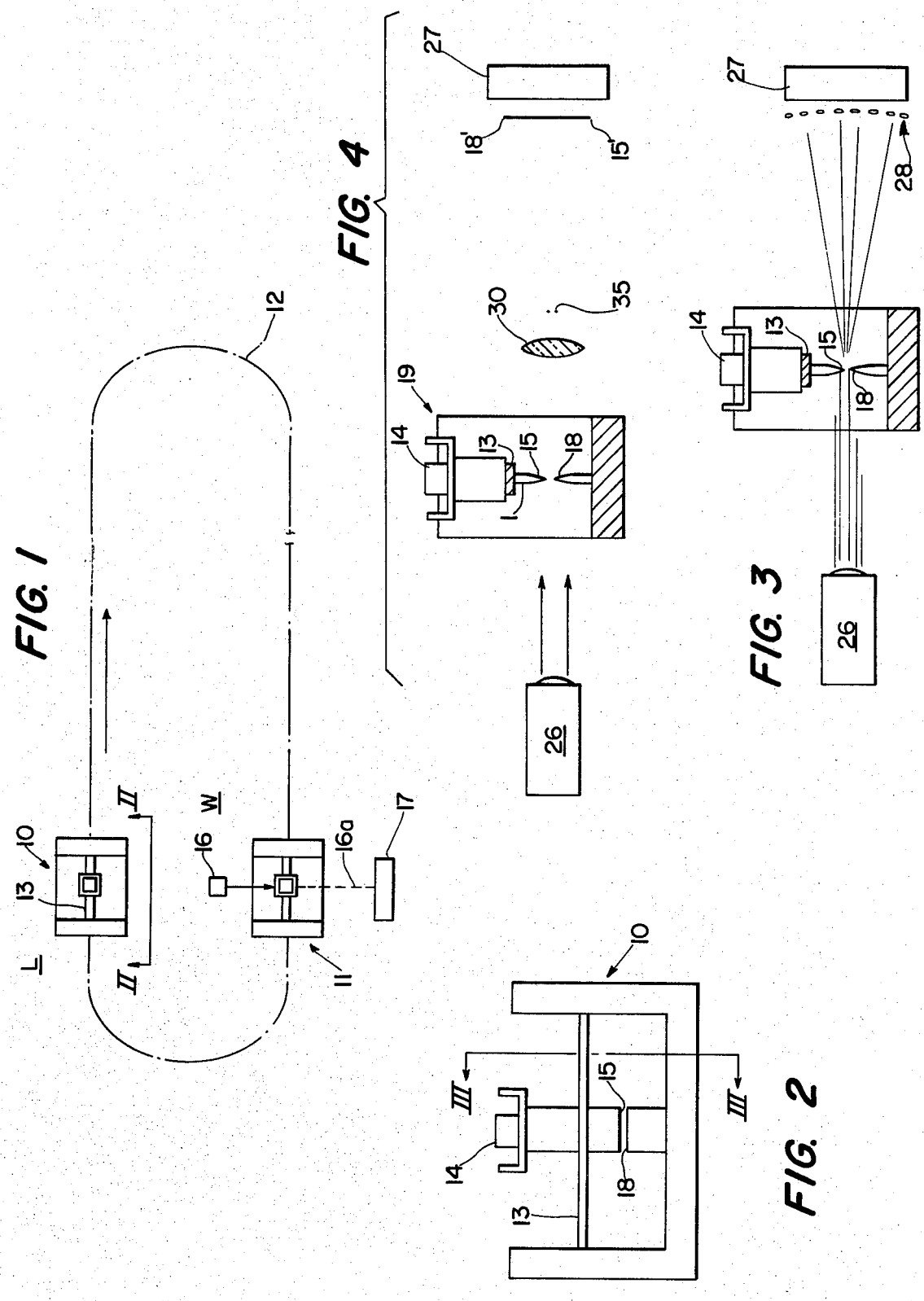

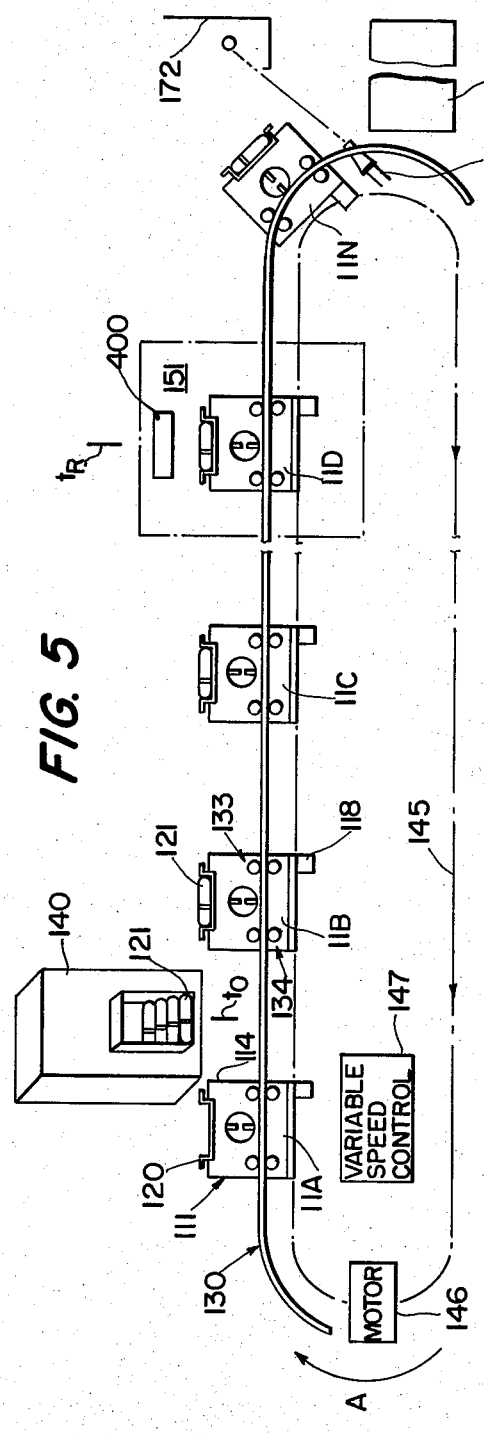
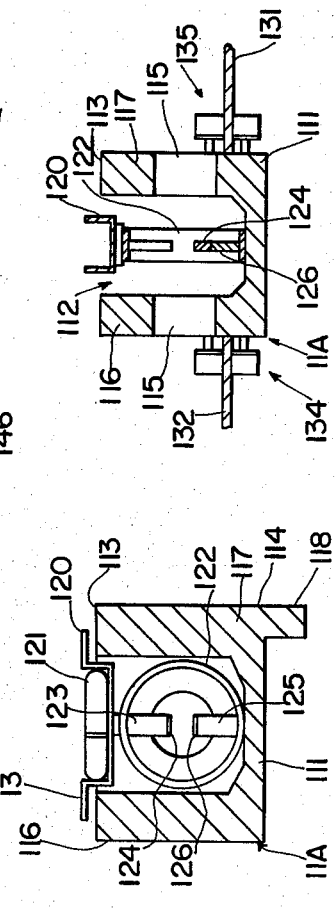
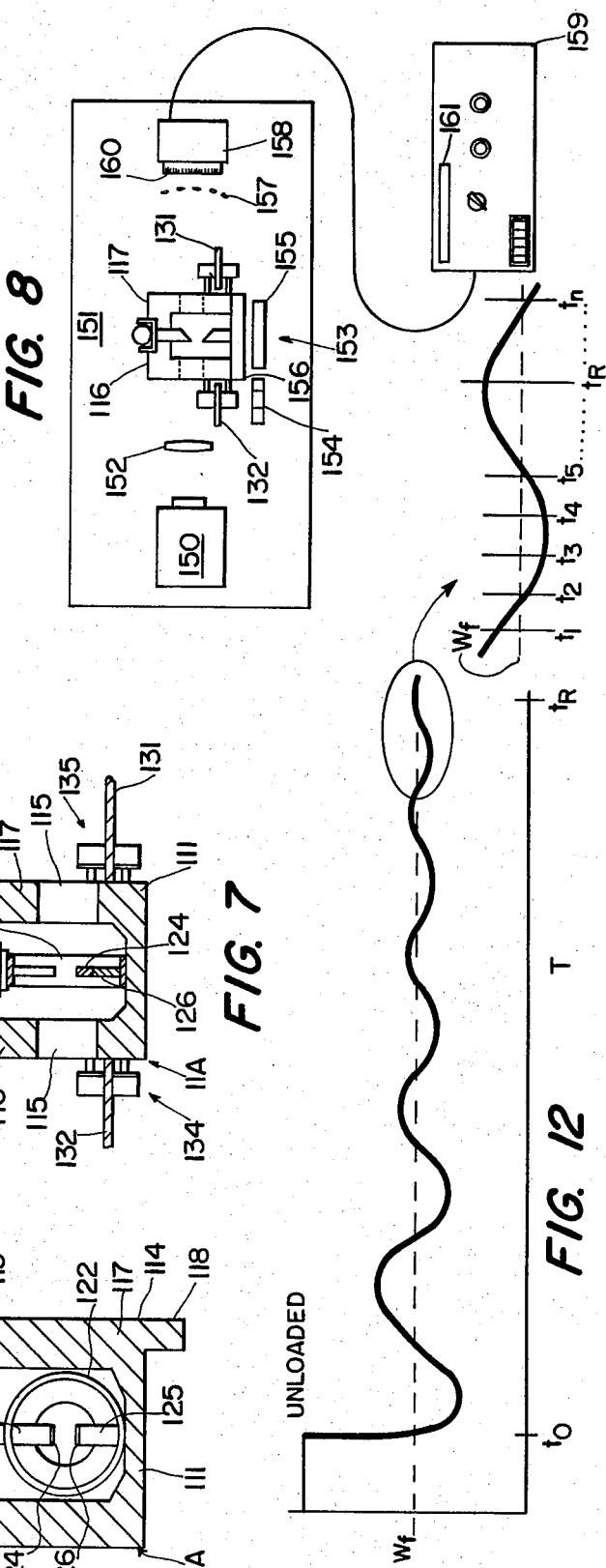

DIFFRACTION OPTICAL WEIGHING SYSTEM

BACKGROUND OF THE INVENTION

This invention relates to methods and devices for weighing. In particular, the invention relates to rapid and accurate weighing. In one aspect, the invention relates to accurate and rapid weighing of relatively small items, in the 0.1 to 10 gram range, such as nuclear fuel pellets and pharmaceutical tablets and capsules, at speeds of up to 100 items per second and above.

The invention relates to subject matter described in Disclosure Document No. 059719, filed Apr. 14, 1977.

Many attempts have been made in the past to achieve rapid and accurate weighing. However, almost all systems for weighing individual items in a dynamic way have involved placing the part onto a weigh pan, observing its deflection, and then removing the item, all at the same station. Because of the mechanical motions involved, a limited speed results if accuracy is to be maintained. On the other hand, on- and off-loading functions preclude accuracy. Because of these limitations, existing pharmaceutical scales operating in this manner cannot weigh more than about 30 tablets per minute if an accuracy of 1 milligram per gram (0.1%) is to be achieved. Accordingly, in the pharmaceutical industry, tablets and the like are not generally one hundred percent weighed.

Where lesser accuracy can be tolerated, higher speeds are attainable. For example, the items to be weighed can be loaded onto a belt which in turn passes over a weigh pan dynamically. The accuracies claimed for these devices are generally 0.5 to 1% but actual results are often considerably worse.

The prior art literature relating to accurate high speed weighing is, of course, extensive. In addition to the devices mentioned above, various other systems have been suggested. All of these systems seek the same results: speed and accuracy. However, insofar as we are aware, no previously proposed system is even theoretically capable of achieving a high degree of accuracy and speed without sacrifice of some other important factors, such as reliability, durability, expense, or the like.

It is an object of the present invention to provide a rapid and accurate weighing method and apparatus. It is a further object of the invention to provide such method and apparatus which is nevertheless inexpensive, reliable, and durable.

Brief Summary of the Invention

The foregoing and other objects which will be apparent to those having ordinary skill in the art are achieved in accordance with the present invention by providing a method of rapidly weighing items which includes the steps of: providing a plurality of weigh members, each weigh member including means for receiving an item to be weighed and a moveable member, the moveable member including at least one boundary edge and being moveable in response to the weight of an item in the receiving means such that the boundary edge moves to an extent dependent upon the weight of the item; providing a continuous path for movement of the weigh members in sequence along the continuous path, the continuous path including a location for sequentially loading items to be weighed into the receiving means of a respective weigh member and further including a location for determining the weight of an item borne by a weigh member; loading items to be weighed sequentially into the receiving means of the respective weigh members at the loading location, whereby the moveable member of each respective weigh member undergoes oscillating movement in response to the weight of the item, thereby moving the boundary edge to an extent dependent upon the weight of the item; moving the weigh members bearing the items to be weighed along the path from the loading location to the weight determining location at a rate such that any oscillating movement of the moveable member of a respective weigh member is substantially ceased when the respective weigh member reaches the weighing location; impinging electromagnetic radiation upon the boundary edge of the moveable member of each respective weigh member at the weighing location to produce a pattern of electromagnetic radiation characterized by the position of the boundary edge in the impinging radiation; analyzing the produced pattern of electromagnetic radiation to determine the weight of an item borne by each respective weigh member, and by providing apparatus for rapidly weighing items including, in combination, a plurality of weigh members, each weigh member including means for receiving an item to be weighed and a moveable member, the moveable member including at least one boundary edge and being moveable in response to the weight of an item location in the receiving means such that the boundary edge moves to an extent dependent upon the weight of the item; means for supporting the weigh members for movement in sequence along a continuous path, the continuous path including a loading location for sequentially loading items to be weighed into the receiving means of a respective weigh member and further including a location for determining the weight of an item borne by a weigh member; means for loading items to be weighed sequentially into the receiving means of respective weigh members at the loading location; means for moving said weigh members along the path from the loading location to the weight determining location; means for impinging electromagnetic radiation upon the boundary edge of the moveable member of each respective weigh member at the weighing location to produce a pattern of electromagnetic radiation characterized by the position of the boundary edge in the impinging radiation; and means for analyzing the produced pattern of electromagnetic radiation to determine the weight of an item borne by each respective weigh member.

Preferably, the moveable member comprises an elastically deformable member and the weigh member includes a fixed boundary edge in addition to the boundary edge of the moveable member. An interference pattern is produced by the interaction of diffraction waves emanating from the boundary edges.

Definition of Terms

The term "item" used in the expression "item to be weighed" means the thing to be weighed in a general sense including loose powder or liquid and is not limited to a discrete object such as a tablet, capsule, or the like.

The term "boundary edge" is used in a sense to denote not only a true edge of an object such as a knife edge, but any sharply defined change in a surface, such as a change in reflectance, which functions as a true edge and produces a diffraction wave when impinged upon by electromagnetic radiation.

The terms "weighing", "determining the weight" and the like each mean, in addition to determining actual weight (such as 1,000 gram), determining if the weight of an item is within or outside of a given range of weight.

The term "weight" when used herein to refer to deformation of an elastically deformable member in response to the weight of an item carried by said weigh member means the force exerted by the item on the weigh member under the influence of whatever accelerating force, such as the force of gravity or centrifugal force, is actually effecting the deformation.

The term "substantially ceased" means that at the time of weight determination the motion of the item to be weighed caused by the loading function, (for example dropping the item onto the weigh pan), has stopped, at least within the accuracy desired of the measurement.

The term "pattern" is used to denote a spatial distribution of electro magnetic radiation whose features and/or intensity can be analyzed to give dimensional information proportional to weight of the item, according to the invention. Of particular interest in this invention are patterns in the form of diffraction wave interference patterns, and patterns provided by images of boundary edges formed by lenses, using transmitted and/or diffracted radiation.

The term "visible or near visible spectrum" includes visible light, infra-red, and ultra-violet.

Detailed Description

There follows a detailed description of a preferred embodiment of the invention, together with accompanying drawings. However, it is to be understood that the detailed description and accompanying drawings are provided solely for the purpose of illustrating a preferred embodiment and that the invention is capable of numerous modifications and variations apparent to those skilled in the art without departing from the spirit and scope of the invention.

FIG. 1 is a diagrammatic plan view of a weighing apparatus in accordance with the invention and illustrating its principal components;

FIG. 2 is a diagrammatic side view, in the direction of line II—II of FIG. 1, of a weigh member of the apparatus of FIG. 1 and enlarged and showing more detail;

FIG. 3 is a diagrammatic view of a weighing system showing a side elevation sectional view of the weigh member of FIG. 2 taken along the line III—III.

FIG. 4 is a diagrammatic side elevation view of another embodiment of the invention.

FIG. 5 is a diagrammatic side elevation view of a weighing apparatus in accordance with the invention.

FIG. 6 is a diagrammatic side elevation view, partly in section, of a weigh member of the apparatus of FIG. 5;

FIG. 7 is a diagrammatic front elevation view, partly in section, of the weigh member of FIG. 6;

FIG. 8 is a diagrammatic front elevation view of a weighing location in the apparatus of FIG. 5;

FIG. 12 is a graph showing the action of multiple weight readings.

Figure 9:
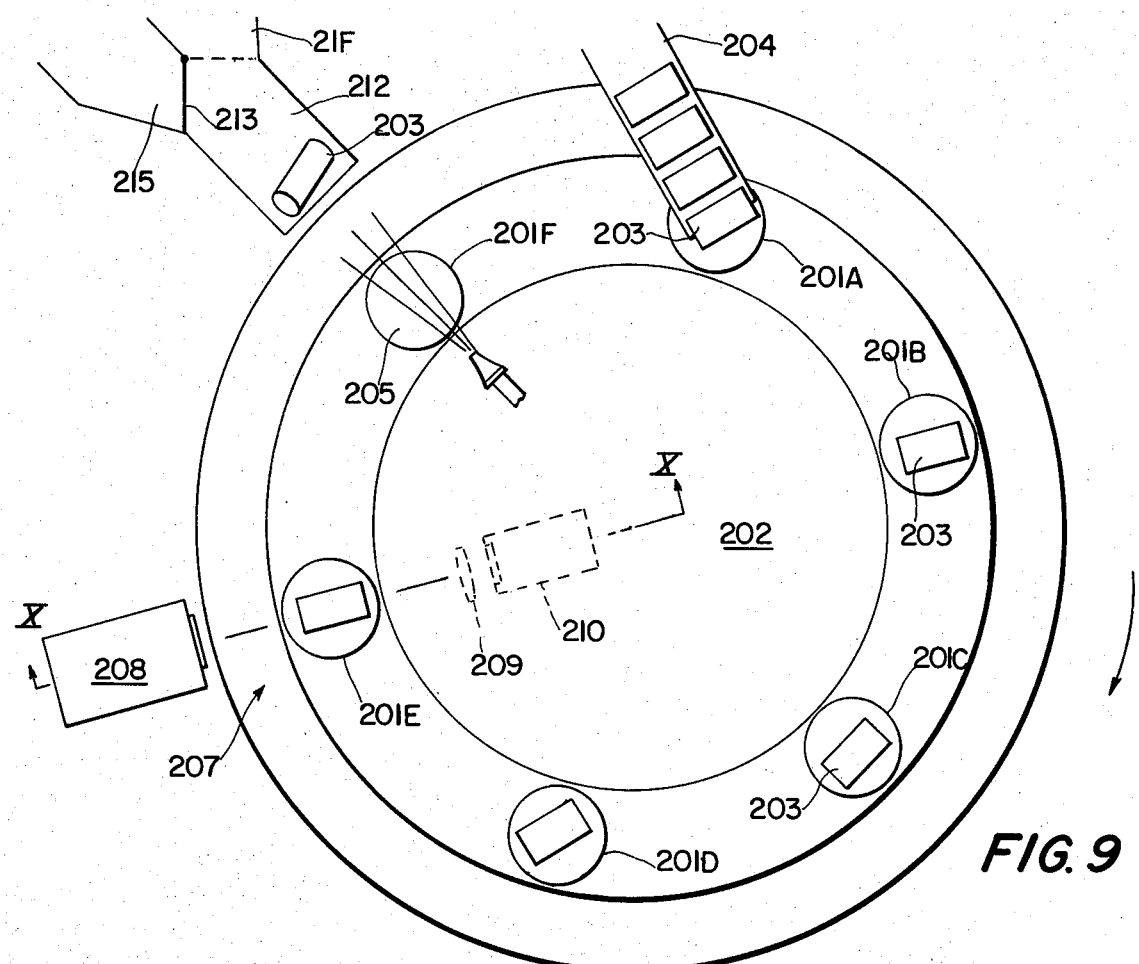
FIG. 9 is a diagrammatic plan view of an alternative embodiment of the invention.

With reference to FIG. 1, a plurality of weigh members, only two of which (10, 11) are shown, are moved in the direction of the arrow in a continuous path indicated by line 12. The continuous path includes a loading location (L) for loading an item to be weighed into a weigh member (in this case weigh member 10) and a weighing location W for determining the weight of an item carried by each weigh member (in this case weigh member 11). The weigh members are preferably moved continuously in path 12 to permit a high rate of operation. Each weigh member (FIG. 2) includes an elastically deformable member 13 which is deformable, in this case vertically, in response to the weight of an item 14 carried by the weigh member. Elastically deformable member 13 has at least one boundary edge which 15 moves to an extent proportional to the weight of an item 14 carried by the weigh member. Each weigh member is supported for movement in the horizontal path 12 and is thus fixed in vertical position. The force of gravity acts vertically downward on member 13 causing it to elastically deform to an extent proportional to the weight of item 14 and boundary edge 15, of course, moves similarly. Weight of an item is determined at a location W by means of electromagnetic radiation, conveniently in the visible or near visible spectrum. This is effected by impinging electromagnetic radiation from a source 16 onto the boundary edge 15 of the weigh member. This produces a pattern 16a of electromagnetic radiation which is characteristic of the position of boundary edge 15 in the incident radiation. The pattern is analyzed by a suitable detector 17 to determine the weight of an item carried by the weigh member. Since the weight determination is effected at a single location W by a single stationary system which includes a readily available radiation source 16 and detector 17, and since the determination is made without physical contact between the weigh members and the weight determination system, weight determination is inherently reliable and inexpensive. The weigh members themselves are also simple in construction, rugged and inexpensive. Accordingly, even though the device may include hundreds of weigh members, the apparatus has inherent simplicity, durability and reliability. The structural arrangement for supporting the weigh members for movement in a continuous path is, of course, conventional and well developed as are the devices for moving the weigh members along that path, dispensing devices for loading items into the weigh members, and devices for off-loading items from weigh members including separation of rejects. Thus, the entire apparatus is inherently inexpensive and durable.

It will be readily appreciated that analysis of pattern 16a produced after deformation of member 13 to a deformed position is compared with a known position of that member in order to determine the weight of an item causing that deformation. In general, two basic techniques can be used. In the first, a characteristic "rest" radiation pattern is determined for each weigh member with no item carried. A radiation pattern subsequently produced when an item to be weighed is carried by a weigh member is compared with the "rest" pattern for that weigh member. In the second, a characteristic "desired" radiation pattern is determined for each weigh member with an item of correct weight carried. A radiation subsequently produced when an item to be weighed is carried is compared with the "desired" pattern for that weigh member. In either event, the basic comparison information is readily stored in a conventional microcomputer which can also effect analysis of the radiation patterns, make comparisons, and give results directly in weight is desired.

It is preferred that each weigh member include a second or "reference" boundary edge 18 which is fixed with respect to the weigh member. The boundary edge that moves in response to elastic deformation of the elastically deformable member (and which is conveniently an actual edge of that member or a member rigidly secured thereto) thus moves relative to the reference boundary edge, and the electromagnetic radiation used to determine weight is impinged upon both of these edges. Thus, the pattern of radiation produced is characteristic of both of these boundary edges. It is not required that the second boundary edge forms a part of a weigh member. Alternatively, a single boundary edge member could be located at the weighing location in position such that the first boundary edge of each weigh member, when in the weighing location, is in operative position relative to the second, or reference, boundary edge such that the electromagnetic radiation impinges upon both of the boundary edges. In any event, it is preferred that both of the boundary edges are carried by and move with each respective weigh member in its continuous movement.

One of the important features of the invention is to provide a system in which the elastically deformable member 13 comes to rest, or at least substantially so, within a reasonably short time after an item to be weighed is loaded onto a weigh member. This permits maximum accuracy and speed at least expense. If a long time is needed for this purpose, the size of the system for a given production rate will become unmanageable and equipment costs will accelerate. In a dynamic system of this sort, accuracy is a function of the ease of deformation of the elastically deformable member: the more sensitive the member, the more accurate the weight determination. However, the more sensitive the deformable member, the longer the time required for that member to come to rest after initial deformation by receipt of an item to be weighed. For this reason, it is preferred to use the first and second boundary edges to produce an interference pattern of the type referred to in earlier Pryor U.S. Pat. No. 3,664,739 and U.S. Pat. No. 3,884,581, the disclosures of which are herein incorporated by reference. We have found that these interference patterns change dramatically with very small changes in the position of the first boundary edge in the impinging electromagnetic radiation. Accordingly, we have found that, with diffraction pattern systems, we can employ a relatively "stiff" elastically deformable member with which deformation movement ceases very rapidly and thus permit very rapid weighing at an accuracy heretofore unattainable in any feasible weighing system. Thus, using a laser as radiation source 16, and employing first and second boundary edges (such as 15, 18 in FIG. 2) each of which produces a diffraction wave which interact to form an interference pattern as explained more fully in the patents mentioned above, we can achieve an order of magnitude improvement over previously known systems—that is, we can achieve the same accuracy at ten times the rate, we can achieve ten times the accuracy at an unchanged rate, or we can achieve any combination therebetween.

Operation of a system using a diffraction pattern will now be discussed with respect to FIG. 3 which illustrates a system employing weigh members of the type shown in FIG. 2. Laser 26 illuminates the gap or slit between a moveable boundary edge 15 and fixed or reference boundary edge 18. A sensing system 27 is provided to scan the resulting diffraction pattern 28. The position of boundary edge 15 is determinable in many ways such as by determining the width of the gap between edges 15 and 18 and weight can be determined by any one of several formulas such as:

$$\text{Weight} = K (W_0 - W_1) \quad (1)$$

where $K$ = the elastic constant for the particular weigh member (e.g. 10 grams/inch)
$W_0$ = the width between edge 15 and 18 with no weight applied; and
$W_1$ = the width between edges 15 and 18 with weight applied; or $$\text{Weight} = KR\lambda(1/S_0 - 1/S_1) \quad (2)$$

where $K$ = the elastic constant for the particular weigh member
where
$R$ = the distance from the gap between the boundary edges to the readout plane
$\lambda$ = wavelength of incident radiation
$S_0$ = distance between two reference points (such as fringe maxima or minima) in the interference pattern with no weight applied; and
$S_1$ = distance between the two reference points in the interference pattern with weight applied. As is fully disclosed in the patents mentioned above, a system of this type can achieve an extremely high resolution of boundary edge position, slit width, and the like. Sub microinch accuracies can be achieved thus making it possible to achieve highly accurate weight determinations. As an extreme case, a 0.1 microinch resolution of a 0.010 inch change in slit width yields a weight resolution of 1 part in 100,000. With such accuracy achievable in the system, we are able to employ a relatively stiff elastically deformable member to permit elastic deformation movement to cease quickly which, in turn, permits rapid weighing. However, the resulting accuracy is still high such that it is possible to achieve the aforementioned order of magnitude improvement in combined speed and accuracy.

In addition to providing a very accurate way of determining weight, the diffraction-based system has another distinct advantage: namely, that it can be utilized in a system in which the weigh members move continuously. This permits maximum operating speeds in that it is not necessary to arrest the motion of the weigh member during a weight determination.

In the embodiment illustrated in FIGS. 1-3, the member moveable in response to the weight of an item is elastically deformable. While this is preferred for purposes of simplicity, low cost, durability, and the like, it will be apparent that devices in which a restoring force is generated by other means, such as magnetic, electrical, electro-magnetic, balance beam, and the like could be used. External damping of the moveable member, such as magnetic, dash-pat, or the like, may also be employed. Again, however, such items increase cost and complexity and the internal damping achieved by using a stiff elastically deformable member is preferred.

The nature of the electromagnetic radiation can vary widely. Visible or near visible radiation is preferred as a practical matter because of the ready availability of inexpensive and reliable radiation sources and detectors. For many reasons, a laser is the preferred radiation source and the preferred wavelength of radiation is that of such readily available lasers.

The characteristic pattern of electromagnetic radiation produced by impingement of radiation during weight determination is preferably an interference pattern produced by diffraction waves emanating from the first and second boundary edges. This system is preferred because of the high degree of accuracy achievable at a given weighing rate. However, if less accuracy is acceptable, other systems can be used, one of which is illustrated in connection with weigh member 19 depicted in FIG. 4. The general construction of weigh member 19 is the same as that of 10 and 11 and like parts are designated with like numerals. As in previous embodiments, separation, W, between edges 15 and 18 is a function of deformation of member 13 due to item weight.

The significant difference in this embodiment is in the method of determining the change in separation due to weight. In this case, a lens, 30, is utilized to form an image of the edges 15 and 18 on a scaning detector unit 27, itself typically a solid state photo diode array. The spatial separation between image points 15'-18' is determined and, using the lens magnification if any, used to find width W, from which equation (1) can be used to determine weight. A typical system of this type, using a pulsed laser source, can determine W to 0.2 microns, using optical magnifications of 25× coupled with scan resolutions of 5 microns. While good, the diffraction approach described above can have ten times this resolution with a reader reliability and is thus preferred.

It should be noted that a diffraction "image" version of this embodiment can give somewhat better results too. In this case, image points 15' and 18' are produced only using diffraction waves. This is accomplished using DC stop 35 at focal point of lens 30 to block undiffracted rays. This technique allows the point 15' and 18' to be determined as centroids of radiation or minimum points of radiation.

With reference to FIG. 5, weighing apparatus in accordance with the invention includes a plurality of weigh members, five of which—11A, 11B, 11C, 11D, 11N—are shown. Each weigh member is identical and weigh member 11A is shown in more detail in FIGS. 6 and 7 for purposes of illustration. The weigh members each include a relatively massive box-like member 111 having a central blind cavity 112 open at the top surface 113 of member 111. As will be explained below, the weigh members, in use, move in a path in the direction of arrow A of FIG. 5. Accordingly, directional terms such as front, rear, side, etc., are used herein with respect in the sense of such motion. For example, the front wall 114 of member 111 is that wall which is forward in the sense of motion of weigh member 11A during use of the apparatus. A lateral bore 115 extends through the side walls 116, 117 of member 11. A lip or flange 118 extends downwardly from each weigh member.

Each weigh member is also provided with a receiving "boat" or container 120 for receiving an item to be weighed. In the illustrated embodiment, the items to be weighed are discrete pharmaceutical capsules 121. Each weigh member is also provided with an elastically deformable member 122 which, in the illustrated embodiment is in the form of a ring. The lowermost portion of ring member 122 is fixed to the box-like structure 111 in any convenient manner such as by brazing or welding or by mechanical fasteners. A first boundary edge member 123 is secured to the uppermost portion of ring member 122, depends downwardly therefrom and has a first boundary edge 124 at its lowermost end. A second boundary edge member 125 is secured to the lowermost portion of ring member 22, extends upwardly therefrom and has a second boundary edge 126 at its uppermost end. Members 123 and 125 are arranged such that boundary edge 124 and 126 are separated by a gap W, the size of which changes on deflection of elastically deformable ring member 122. In the illustrated embodiment, members 123 and 125 and the gap W formed therebetween are in vertical alignment.

Container 120 is fixed to deformable ring member 122 such that ring member 122 is elastically deformable in response to the weight of an item located therein. In the illustrated embodiment, container 120 is secured to the uppermost portion of ring member 122 in vertical alignment with members 123, 125, and the gap therebetween and is symmetrical about a vertical axis passing through the center of ring member 122. It will be readily understood that first boundary edge 124 thus moves downwardly with the upper portion of ring member 122 to an extent proportional to the weight of any item in container 120. On removal of the item, of course, first boundary edge 124 moves upwardly from its deformed position to its rest position.

The apparatus further includes a track structure 130 for supporting the weigh members for movement in sequence along a continuous path. In the illustrated embodiment, the path is an oval in a vertical plane and track structure 130 includes a pair of parallel tracks 131, 132, each of which is oval as shown in FIG. 5. Tracks 131 and 132 are supported in position in any convenient manner such that a gap is formed therebetween (best seen in FIG. 7). The weigh members are supported in position for movement along the continuous oval track path between tracks 131 and 132 by means of four pairs of rollers, three of which (133, 134, 135) are shown in the drawings. The rollers preferably tightly engage tracks 131, 132 for smooth and vibration-free movement of the weigh members, particularly in that location of the continuous path where weight determination is made as discussed below. Note that for maximum smoothness air slides, and other air bearing arrangements can be used, rather than rollers.

Items to be weighed, in this case pharmaceutical capsules 121, are loaded into containers 121 of the weigh members as the weigh member 11 sequentially moves past a dispenser, such as hopper dispenser 140, provided along the continuous oval path at any convenient location.

The weigh members are moved, preferably continuously, in the direction of arrow A by means of an endless belt 145 which drivingly engages a lip or flange 118 which extends downwardly from each weigh member. Member 118 is connected to drive belt 145 in any convenient manner and drive belt 145 can be a belt, chain, or other convenient member, driven by a motor 146 preferably the speed of which is controllable as desired by means of a conventional variable speed control 147. When motor 146 is energized, the weigh members are caused to move sequentially in the continuous oval path and each will move in sequence past the dispenser 140 to a weighing location located "downstream", in the sense of movement in the path, of the dispenser, and thence to the dispenser and so on, continuously.

Weight of an item borne by each weight member is determined by means of impinging electromagnetic radiation at the gap W formed between first and second boundary edges 124, 126 of members 123, 125 and by analyzing the pattern of electromagnetic radiation produced by such impingement. Since the size of the gap is a function of the deformation of ring member 122 and since that deformation is elastic, it will be understood that when an item to be weighed is placed in container 121, the ring will undergo an up and down elastic deformation movement and that a finite time will be required before oscillating movement ceases, unless critical damping elements are employed. It is a particular feature of the invention that, because of the very high sensitivity which is achievable, the elastically deformable member of a weigh member can be made sufficiently "stiff" such that its elastic deformation movement ceases or at least substantially ceases in a very short time while retaining the ability to make very accurate weighings. For this reason, weighing apparatus in accordance with the present invention can achieve very rapid weight determination which is also very accurate because elastic deformation movement has at least substantially ceased. Thus, the present invention avoids the need for compensating for deformation movement which would persist during weight determination should similar speed be sought in a system in which a less stiff member was required to achieve the same accuracy. By providing a variable speed motor 146, the time between loading and weighing can be adjusted as appropriate for particular items in order to ensure that deformation movement is substantially ceased when a weight determination is made.

A source of electromagnetic radiation 150 (see FIG. 8) is positioned adjacent the track support at weighing location 151 located a suitable distance downstream of dispenser 140, preferably substantially the maximum distance permitted by the apparatus. In the illustrated embodiment, the items being weighed are maintained in their respective containers 121 solely by gravity and, accordingly, when the weigh members are inverted in their oval path, the items fall from their containers under the influence of gravity. Thus, the maximum distance permitted is slightly less than half the continuous path. Much longer distances between these stations are easily achieved by other arrangements such as by moving the weigh members in a path which is continuous in a horizontal plane.

In the illustrated embodiment (see FIG. 8) radiation source 150 includes a pulsed diode laser firing a 200 nano second burst which passes through lens 152 and impinges upon first and second boundary edges 124, 126 of a weigh member (11D in FIG. 5) positioned at weight determining location 151. The burst of electromagnetic radiation is timed to the arrival of each weigh member (in this case 11D) adjacent laser 150 such that the radiation passes through bore 115 in side wall 116 of weigh member 11D for impingement onto boundary edges 124, 126. Timing is conveniently achieved by an appropriate weigh member positioning senser system 154 which includes a light emitting diode 154, a light detector 155 and a "flag" or arm 156 secured in appropriate position on each weigh member. Drive member 118 can be used for the purpose if desired. The system is controlled by appropriate means such that a burst of electromagnetic radiation from laser 150 impinges upon boundary edges 124, 126 irrespective of the linear speed of the weigh members.

It is preferred that the weigh members are moved continuously in the continuous path and it is a distinct advantage of the invention that highly accurate weighings can be made rapidly without arresting the motion of the weigh members. However, it is possible to move the weigh members incrementally in which case the weigh members are stationary during loading, during weighing, or both.

The electromagnetic radiation impinging upon boundary edges 124, 126 produces a pattern of electromagnetic radiation which is characterized by the positions of the boundary edges in the impinging radiation. In the illustrated embodiment, the impinging radiation produces an interference pattern 157 caused by the interaction of diffraction waves which emanate from the boundary edges, each of which acts to produce a diffraction wave when the electromagnetic radiation is impinged thereon. A detector 158 and microcomputer 159 are used to analyze the diffraction pattern to determine the weight of each item carried by a respective weigh member. In the illustrated embodiment, detector 158 is of the type described in Pryor, U.S. Pat. No. 4,009,965. The detector includes a scanning photodiode array 160 having 1024 elements on one mil centers and is scanned in sequence, after laser 150 is pulsed, under the influence of a suitable control. The diode array stores the charge of the light intensity of diffraction pattern 157 on its face, thus allowing the subsequent scan. Electrical signals from the scan are fed to microcomputer 159 whereby weight determination is made based, of course, on the spacing between edges 124 and 126. Microcomputer 159 conveniently includes a readout 161 which gives results directly in weight. The disclosure of U.S. Pat. No. 4,009,965 is herein incorporated by reference.

After passing weighing location 151, a weigh member becomes inverted in its oval path in which case a weighed item falls by gravity and a receptacle 170 is positioned to receive the falling items. If a weighed item is underweight, the microcomputer may include an appropriate circuit to trigger a blast of compressed air through a nozzle 171 timed to divert a falling item from receptacle 170 and into a separate receptacle 172 for underweight items. The microcomputer may also include a circuit to energize nozzle 171 to divert overweight items. If desired, of course, the underweight and overweight items may be diverted to separate receptacles.

Since there are a number, in some instances a very large number, of weigh members in a particular system, it is preferred to keep the cost of each weigh member as low as possible. Thus, while it is possible to construct weigh members which have the same original gap between boundary edges and which have the same movement characteristics (e.g. the same elastic constant) it is very likely that individual weigh members made at reasonable cost will have differing characteristics. It is therefore preferred that the individual weigh members are made inexpensively and that the characteristics of each weigh member are determined. For this reason it is preferred that the system includes a device, such as a mini computer, in which the calibration characteristics of each weigh member can be stored and taken into account for a weighing determination. Knowledge of which weigh member is in weighing position is readily provided by a sensor which, in the simplest case, can start from a zero reference point and incrementally tally up the number of cells in succession. Alternatively, each weigh member could be encoded with its individual characteristics and these could be read out by appropriate means provided for the purpose. A mini computer is readily adaptable to this and other purposes in the present invention and its use in a weigh system and method in accordance with the invention is therefore preferred. For example, a mini computer would allow dynamic updating of calibration which can be accomplished by running with items of known weight or with no items.

In a preferred method of operation, microcomputer 159 determines the spacing $S_1$ of one or more of the fringes or the average spacing (which tends to be more accurate since more data points are used) and calculates the slit width in accordance with the principles fully developed in earlier Pryor U.S. Pat. No. 3,884,581 herein incorporated by reference. This calculated width is then compared (i.e. subtracted) from the initial width for that weigh member obtained from memory and the difference is multiplied by the calibration constant, also obtained from memory, for that weigh member to obtain the weight of the item weighed, per equation (1) above. Thus, in a few milliseconds, the item has been weighed and its disposition can then be determined. Typically, if the weight is 2 percent high or low, the item is rejected by means of an air blast from device 171 or the like.

The device used for detecting the pattern of electromagnetic radiation can vary widely and, in particular, can be any of the detector systems disclosed in the Pryor patents incorporated by reference hereinabove.

It is preferred that the gap W which exists between the boundary edges (such as edges 124, 126, in FIG. 6) move in a plane which is normal to the incident electromagnetic radiation (such as from source 150, FIG. 8). However, this is not necessary and the boundary edges may be offset in the direction of incident radiation (the "Z" direction) as disclosed in Pryor U.S. Pat. No. 3,883,249, herein incorporated by reference.

The boundary edges may be any of the edges or diffraction wave producing means of earlier Pryor U.S. patents hereinbefore incorporated by reference. A stage of mechanical amplification can be incorporated into the unit to magnify the change in the slit width as disclosed, for example, in earlier Pryor U.S. Pat. No. 3,884,581.

Other pattern scanning systems can be used. For example, scanner units using a rotating or galvo driven mirror and a dual photo cell arrangement. This is quite feasible since the speed of rotation of the galvo can be several kilohertz. However, a CW laser is generally required (rather than a pulsed diode or other type) since no storage can be used. (The detector is exposed sequentially rather than all at once as in a diode array.)

A particular advantage of the present system is that by locating a source of electromagnetic radiation outside the weigh member (and therefore not attached to the moving parts) the patterns of all weigh members are produced in the same location, and may be centered in the radiation. Thus, even flutter of the moving parts in a direction perpendicular to a laser beam will cause no change in the detector output signal, assuming the laser beam's intensity is constant over the slit during the time of the flutter, which is readily accomplished.

Assuming sufficient rotational speed, it would be possible to weigh the items, such as nuclear fuel pellets, using the centrifugal force generated by the rotation rather than gravity, with apparently the same advantages. In this case, the individual load cells would conveniently be arrayed outwardly from a disc with the laser beam axis parallel to the axis of rotation of the disc.

Advantages of the centrifugal approach would lie in the possible imperviousness to flutter which it presents, and in the different possibilities for loading and ejection of items. Perhaps the biggest advantage of the centrifugal approach is that in very high speed rotary systems, there are considerable centrifugal forces present and that building systems that utilize these forces (rather than trying to get around them) could be the best approach. And too, it is possible to have centrifugal G loads far in excess of gravitational, allowing more deflection to take place in a given stiffness member for a give size pellet. This could have advantage for example, if it was desired to have the pellet loading higher than other potential spurious forces due to vibration and so on which could be present because of the mechanical arrangement of the system.

It is important to note that the weigh system utilizes an absolute reading of the position of the weigh pan (i.e. the position of its boundary edge) relative to the fixed reference. In other words, an absolute value of slit width $W_o$ between one diffraction wave producing edge whose position is determined by the position of the weigh pan or the like used for receiving the item to be weighed and another diffraction wave producing edge which is fixed with respect to the weigh members which holds the weigh pan. To obtain an absolute value of slit width from the diffraction pattern, several techniques can be employed. One of the best is to scan the pattern to determine the spacing of any two fringe maximum or minimum preferably one on either side of the pattern centerline. Detection of movement within one part in 4000, for example, is readily accomplished using the equipment described herein and is the Pryor patents mentioned above. Another scan type is to find the fringe spacing and from that determine the location relative to the center of whatever fringe must be there. This can be utilized to obtain one part in 100,000 measurement since it combines incremental capabilities of the diffraction interference pattern with an absolute readout.

The physical scanning of the pattern is best performed utilizing a linear photo diode array although other arrangements, such as scanning oscillating mirrors with angular position encoders, can be used. The scanning photo diode array is the instrument of choice however. These arrays store charge and, therefore, the pulse diode laser can be used to illuminate it very rapidly in, e.g. 200 nano seconds, freezing the motion, with readout after the fact.

For comparing against fixed limits, it is also possible to use a strictly single or dual detector located in one fringe position of the pattern, as has been disclosed in Pryor U.S. Pat. Nos. b 3,884,581 and 3,664,739. This version is very inexpensive and would work best if all load cells in the system were calibrated identically. Accuracy would be typically one percent. It is not particularly a linear system except over short displacement ranges. However, this is not a problem if the goal is simply to weed out all capsules say, over some set points (e.g. 5% too high or too low).

When a lens system such as lens 152 is utilized, the pattern is formed at the focus of the lens system, no matter where the slit is located in space. Because the pattern will always form in the same location, this can be of considerable interest if there is uncertainty as to the load cell location.

It should also be noted that it is not necessary to utilize a pulsed laser or even a laser at all. However, as in the earlier Pryor patents, the laser makes the best source for producing diffraction patterns, and the pulsed laser allows the minimum use of laser power as well as the ability to "freeze" the cell position. This is particularly of interest if there is a varying slit width, although the slit width zone of interest can be masked off, which in effect results in a self-strobing action.

As noted above, other diffraction wave producing means such as use of double slits, gratings, etc., described in the previous Pryor patents can also be used here. Particularly of interest are those able to read absolute value of width $W_o$, rather than incremental such as single and double slit type diffraction wave producing means of those earlier patents. As previously noted however, it is not even necessary to use diffraction. For example, a simple image of the slit can be formed as in FIG. 4, on scanning photo diode array. This technique however, is not as accurate as the diffraction pattern and is therefore not preferred.

Figure 10:
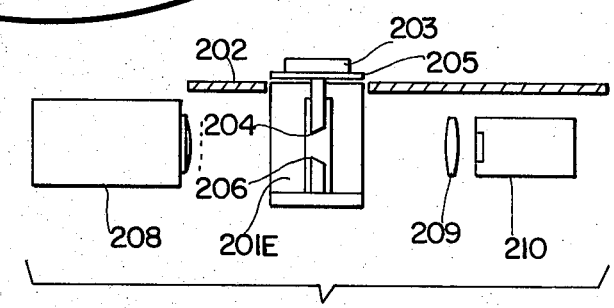
FIG. 10 is a diagrammatic side elevation view of a portion of the device of FIG. 9 taken along the line X—X.

In another preferred embodiment, as illustrated in FIGS. 9 and 10, the weigh members 201 A, B, C, etc., move in a horizontal path adjacent the periphery of a rotating horizontal disc 202. It will be understood that many more weigh members would ordinarily be provided and that the six shown are for purposes of illustration. Items 203 to be weighed are dispensed individually from a loading device 224 onto weigh members which move past the loading location sequentially and continuously. Each weigh member includes a boundary edge 204 (see FIG. 10) moveable with weigh pan 205 in response to the weight of an item 203 carried thereby and a boundary edge 206 which is fixed with respect to weigh member 203. It will be understood that each weigh member 201 is fixedly secured in disc 202 and that the disc rotation is controlled at a suitable constant rate such that the oscillating movement of boundary edge 206 substantially ceases when the weigh member arrives at a weight determining location 207. As seen in FIG. 10, a sourse 208 of electromagnetic radiation is positioned to impinge upon edges 204, 206 beneath disc 202 and the interference pattern produced is passed through lens 209 and thence onto detector 210 and weight is determined as before. Weighed objects are removed by any suitable means such as an air blast through nozzle 211 which directs weighed items off weigh pan 205 and into a discharge chute 212. A gate 213 is mounted in the chute and moveable between a first position for diverting items of correct weight to conduit 214 and a second position, shown in dashed line, for diverting rejects to conduit 215.

Operation of the device depicted in FIGS. 9 and 10 is preferably similar to that of the devices of FIGS. 4–8, the major difference being that the path of motion of the weigh members is horizontal.

Figure 11:
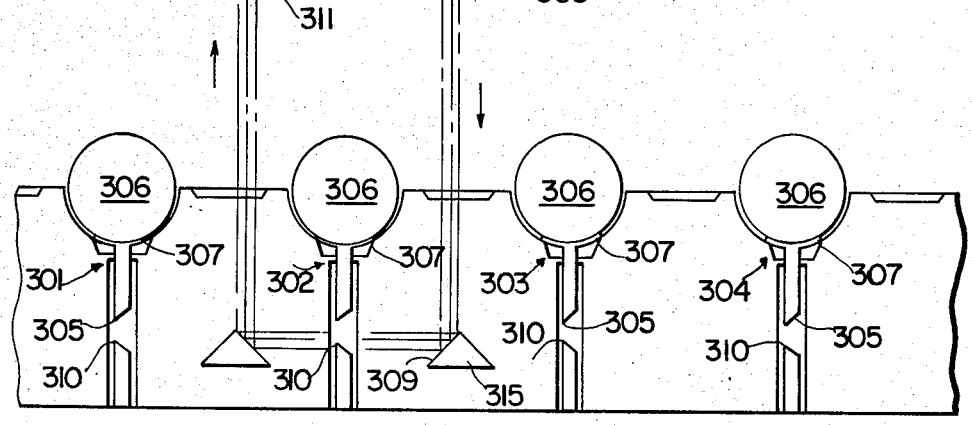
FIG. 11 is a diagrammatic cross-sectional end elevation and view of a further embodiment of the invention.

In the foregoing embodiments a single "row" of weigh members is utilized. By "row" is meant a plurality of weigh members which move sequentially in a path. It is a feature of the present invention that a plurality of rows of weigh members can be provided in which case the capacity of the machine can be doubled, tripled, etc., as additional rows are added. A typical arrangement is diagrammatically illustrated in FIG. 11 in which four weigh members, 301, 302, 303, 304, each one being one of a row of weigh members, are shown. More rows, of course, can be present. In this embodiment it is assumed that the weigh members are moving horizontally and towards a person viewing FIG. 11. Each weigh member includes a boundary edge 305 moveable in response to the weight of an item 306 carried by a weigh pan 307 of each weigh member. The loading location is behind, in the sense of the drawing, the weigh members shown and the weigh members are moved toward the viewer to a weighing location such that when they arrive at the weighing location, oscillating movement of edge 305 has substantially ceased. In the drawings, weigh member 302 is shown at its weigh determining location. Electromagnetic radiation from laser 308 is directed downwardly through an appropriate aperture in the body in which the weigh members are supported and onto an inclined mirror 309 fixed in position below laser 308 from which it is directed to impinge upon the gap formed between moveable edge 305 and edge 310 which is fixed with respect to the weigh member. The interference pattern 311 which results is directed by means of inclined mirror 312 onto detector 313. A weight determining system is used for each row of weigh members. If desired, a single laser may be used for two adjacent rows of weigh members in which case mirror 309 may form part of a prism 314 having a second inclined mirror 315 for directing radiation to the adjacent row of weigh members illustrated by weigh member 303. Operation of this device is preferably the same as discussed above.

Various other arrangements of the systems used to support and move the weigh members can be employed. For example, the weigh members can be secured to belts which move between dumbell shaped rollers. Very precise linear conveying systems which are currently available, are suitable. For example, the large model Hartnett brand of pharmaceutical capsule printing machine transports capsules in discrete boat shaped pockets, about 16 across, in bars which move side by side in a relatively vibration-free environment. The device of FIG. 11 can be regarded as a sectional view through a similar bar adapted to the present invention. The weigh pan of each weigh member may be an elastic membrane, such as an elastomeric sheet, secured at its periphery to an aperture and thus forming a receptacle for an item to be weighed. This is a particularly suitable arrangement for weighing a powder or liquid or other free flowing material.

The weigh members can, of course, be supported from below as shown or from an overhead conveyor in which case each hanger would include a weigh member according to the invention.

Another embodiment can be constructed utilizing buckets for dry products such as grain powder etc. Liquids as well could be measured in such a system. In this case, adjacent cup-shaped or bucket-shaped containers are used for the conveyance and measurement of dry products, liquids, etc. Each individual cell weighs the container and contents therein in a manner completely analogous to setting the same container on a static scale.

The individual bucket cell elements are on a belt which then allows the buckets to empty as the cells go upside down, being loaded at the other end. To facilitate loading without stopping the buckets, sloping sides of the buckets are utilized to allow the powder, liquid, etc., to drain down into one bucket or the other should it fall on the interface between. It is immaterial which bucket has the most since the total amount of grain or liquid being transferred will simply be the sum of the bucket weights. The rationale for using such a scale is to allow the more highly accurate transfer of such materials than would ordinarily be possible given existing weigh belt feeders or rate of flow meters.

Another embodiment is a water wheel arrangement. In this case, the material or objects to be weighed are loaded (or even scooped up) into a container moving in a vertical direction on a wheel. As the container reaches the near-vertical position, more and more of the load is transferred from the sides of the container to the bottom which contains a weigh pan and slit according to the invention. At the centered position, the weight is measured on the fly as the wheel proceeds around. Anything that goes in the container can be measured, such as parts, liquids, grains, etc.

In a variation of the above, the material is loaded and the deflection is such that the whole pan tilts in proportion and the weight is measured after appropriate settling time at the top just before the product is off-loaded. Alternatively, of course, the operation could be in the other direction.

A further embodiment uses a ferris wheel arrangement, in which case the containers are gimbled to swing pendulum-like in the vertical direction. The damping of the pendulum is such that by the time they have reached a point near the discharge location, they have stopped swinging and their true weight can be ascertained just as before. At a further point, they are then off-loaded by upsetting, or otherwise.

In another somewhat different embodiment, the weigh scales are actually part of railway car trucks which are then read out according to the invention as they pass by. This can be extended to on the fly readout of vehicle weights too, on a per axle basis, etc.

There are several more aspects of the invention of interest. First, the orientation of the boundaries measured can be parallel to the direction of motion as previously shown, or perpendicular to said motion, or at any other suitable angle. Generally, the parallel orientation is most convenient, when the direction of motion is horizontal.

While it is envisioned that most applications of the invention will simply utilize weigh members whose motion is substantially at rest (within the accuracy desired) at the readout location, there exists the further possibility to make multiple measurements of moveable member deflection in time, for example as it passes the readout "beam". The purpose of this is to further increase accuracy, or throughput, by taking sufficient data to predict the final resting location even though the cell is largely, but not completely, at rest at the readout location.

For example, consider FIG. 12 which illustrates the typical loading function of an undamped load cell according to the invention. Point $t_o$ is that at which the item weighed hits the weigh "pan" (see FIG. 5) and point $t_r$ is that when readout is made. Normally measurement is made at $t_r$ when motion is substantially ceased within the error desired for the system. However, because of the speed of the optical pattern analysis, it is also possible to read multiple points $t_i$-$t_n$ as the weigh member passes the readout, and use these values to accurately predict the final location of the moveable member and thence item weight. The use of multiple readings also provides a way to average out high frequency mechanical vibrations superposed on the oscillating weight signal, due to the transport mechanism etc.

To arrive at a correct prediction, it may be desirable to know the exact time of loading. Thus a simple optical sensor at point $t_r$ (FIG. 5) can be used to sensing the impulse deflection of the moveable member 13 as the item is dropped or otherwise placed on it. The time of loading, once sensed is sent to the micro computer used to predict weight, together with the rate of travel of the weigh members.

Note that to aid in the prediction process, it may be desirable to take data at more than one point in the distance of travel, thus providing information from two (or more) spaced time intervals such as $t_l$-$t_n$ in FIG. 12.

Another aspect of the invention is that electro-static or electro-magnetic restoring and/or damping can be used if the item to be weighed and/or the moveable member can be so attracted or repelled. This is easily accomplished in the invention since any or all weigh member components, conveying members etc. can be non-magnetic etc. and the radiation source and pattern detection can be remote from the region of the cells. (As noted in passing this remote feature is an important advantage of the invention in nuclear applications and the like where it is desirable to locate instrumentation remote from the object weighed, perhaps behind lead windows etc.).

It is further of interest to consider the combination of magnetic damping and multiple measurement points. In this case, one can measure deflection and cause a force to be generated which will counteract the deflection, thereby bringing the rest condition at an earlier time. One such force actuating element if for example coil 400 in FIG. 5 driven by control unit (not shown) connected to micro computer 159.

What is claimed is:

1. A method of rapidly weighing items comprising the steps of:
   (a) providing a plurality of weigh members, each weigh member comprising means for receiving an item to be weighed and a moveable member, said moveable member comprising a first boundary edge, said moveable member being moveable relative to said weigh member in response to the weight of an item in said receiving means such that said boundary edge moves to an extent dependent upon the weight of said item, said weigh member further comprising a reference member having a second boundary edge said second boundary edge being fixed with respect to said weigh member and spaced from said first boundary edge, said first and second boundary edges defining a gap therebetween, said gap having a size dependent upon the weight of said item;
   (b) providing a continuous path for movement of said weigh members in sequence along said continous path, said continuous path including a location for sequentially loading items to be weighed into the receiving means of a respective weigh member and further including a location for determining the weight of an item borne by a weigh member;
   (c) loading items to be weighed sequentially into said receiving means of the respective weigh members at said loading location, whereby the moveable member of each respective weigh member undergoes movement in response to the weight of said item, thereby moving said boundary edge and forming a gap having a size dependent upon the weight of said item;

(d) moving said weigh members bearing said items to be weighed along said path from said loading location to said weight determining location such that movement of said moveable member of a respective weigh member is substantially ceased when said respective weigh member reaches said weighing location;

(e) impinging electromagnetic radiation upon the first and second boundary edges of the moveable member of each respective weigh member at said weighing location and producing a pattern of electromagnetic radiation characteristic of said gap in said impinging radiation;

(f) analyzing said produced pattern of electromagnetic radiation to determine the weight of an item borne by each respective weigh member.

2. A method according to claim 1 wherein said weigh members are moved in said path in a horizontal plane from said loading location to said weighing location.

3. A method according to claim 1 wherein said pattern of electro magnetic radiation is an image of said first and second boundary edges.

4. A method according to claim 1 wherein step (f) comprises determination of the actual weight of said item.

5. A method according to claim 1 wherein step (f) comprises determination of the weight of an item relative to a reference weight.

6. A method according to claim 1 including the further steps of establishing an acceptable weight range for said items and, after determining the weight of an item, separating weighed items having a weight within the acceptable range from items having a weight outside the acceptable range.

7. Method according to claim 1, wherein said movement of said moveable member has not completely ceased, and wherein the final rest weight is predicted by analysis of said pattern at sequential points in time.

8. A method according to claim 7 wherein magentic or other controlable restoring forces are energized as a function of said analysis of said pattern.

9. A method according to claim 1 wherein individual weigh members have differing weight-dependent characteristics and wherein said method includes the step of storing the weight-dependent calibration characteristics of said individual weigh members and wherein step (f) includes the step of utilizing the stored calibration characteristics.

10. A method according to claim 9 including the further steps of periodically calibrating individual weigh members by following steps (a) through (f) and up-dating the stored calibration characteristics of the weigh members.

11. A method according to claim 1 wherein said moveable member of each weigh member comprises an elastically deformable member.

12. A method according to claim 2 wherein oscillating movement of said elastically deformable member is vertical.

13. A method according to claim 11 wherein oscillating movement of said elastically deformable member is horizontal.

14. A method according to claim 11 wherein said elastically deformable member is sufficiently stiff such that its elastic deformation movement ceases in a very short time.

15. A method according to claim 1 wherein said first boundary edge comprises first diffraction wave producing means, wherein said second boundary edge comprises a second diffraction wave producing means, and wherein said pattern of electromagnetic radiation comprises an interference pattern.

16. A method according to claim 15 wherein the electromagnetic radiation is produced by a laser.

17. A method according to claim 16 wherein said step of analyzing the produced pattern of electro magnetic radiation includes the step of scanning said pattern to determine the relative location of two or more points in said pattern.

18. A method according to claim 16 wherein step (e) comprises pulsing said laser to produce a pulse of said electromagnetic radiation.

19. A method according to claim 18 wherein step (f) comprises storing said pattern and subsequently analyzing the stored pattern.

20. Apparatus for rapidly weighing items comprising, in combination:

(a) a plurality of weigh members, each weigh member comprising means for receiving an item to be weighed and a moveable member, said moveable member comprising a first boundary edge, said moveable member being moveable, relative to said weigh member in response to the weight of an item located in said receiving means such that said boundary edge moves to an extent dependent upon the weight of said item, said weigh member further comprising a reference member having a second boundary edge said second boundary edge being fixed with respect to said weigh member and spaced from said first boundary edge, said first and second boundary edges defining a gap therebetween, said gap having a size dependent upon the weight of said item;

(b) means for supporting said weigh members for movement in sequence along a continuous path, said continuous path including a loading location for sequentially loading items to be weighed into the receiving means of a respective weigh member and further including a location for determining the weight of an item borne by a weigh member;

(c) means for loading items to be weighed sequentially into said receiving means of respective weigh members at said loading direction;

(d) means for moving said weigh members along said path from said loading location to said weight determining location;

(e) means for impinging electromagnetic radiation upon the first and second boundary edges of the moveable member of each respective weigh member at said weighing location and producing a pattern of electromagnetic radiation characteristic of said gap in said impringing radiation; and (f) means for analyzing said produced pattern of electromagnetic radiation to determine the weight of an item borne by each respective weigh member.

21. Apparatus according to claim 20 wherein said first boundary edge comprises first diffraction wave producing means, wherein said second boundary edge comprises second diffraction wave producing means, and wherein said radiation impinging means is constructed and arranged such that said produced pattern comprises an interference pattern.

22. Apparatus according to claim 20 wherein said pattern analyzing means comprises means for determining the actual weight of an item.

23. Apparatus according to claim 20 wherein said pattern analyzing means comprises means for determining the weight of an item relative to a reference weight.

24. Apparatus according to claim 20 further including means for separating weighed items having a weight within an acceptable range from items having a weight outside said acceptable range.

25. Apparatus according to claim 20 wherein individual weigh members have differing weight-dependent characteristics and wherein said apparatus comprises means for storing the weight-dependent calibration characteristics of said individual weigh members and wherein said analyzing means comprises means for utilizing the stored calibration characteristics.

26. Apparatus according to claim 20 wherein said moveable member of each weigh member comprises an elastically deformable member.

27. Apparatus according to claim 26 wherein said weigh member supporting means comprises means for guiding said weigh members in a continuous horizontal path.

28. Apparatus according to claim 26 wherein said weigh member is constructed and arranged such that movement of said elastically deformable member is vertical.

29. Apparatus according to claim 26 wherein said elastically deformable member is sufficiently stiff such that its elastic deformation movement ceases in a very short time.

30. Apparatus according to claim 20 wherein said radiation impinging means comprises a laser.

31. Apparatus according to claim 20 wherein said means of producing said pattern of electro magnetic radiation includes a lens, and said pattern is an image of said boundaries.

32. Apparatus according to claim 30 wherein said pattern analyzing means incorporates further means for scanning said pattern.

33. Apparatus according to claim 32 where in said pattern scanning means contains a photodiode array.

34. Apparatus according to claim 30 wherein said radiation impinging means comprises means for pulsing said laser to produce a pulse of said electromagnetic radiation.

35. Apparatus according to claim 34 wherein said analyzing means comprises means for storing said pattern and means for subsequently analyzing the stored pattern.

* * * * *